United States Patent
Paschkewitz et al.

(10) Patent No.: US 9,423,188 B2
(45) Date of Patent: Aug. 23, 2016

(54) MOLDED PLASTIC OBJECTS HAVING AN INTEGRATED HEAT SPREADER AND METHODS OF MANUFACTURE OF SAME

(71) Applicant: Palo Alto Research Center Incorporated, Palo Alto, CA (US)

(72) Inventors: John S. Paschkewitz, San Carlos, CA (US); David M. Johnson, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 14/139,174

(22) Filed: Dec. 23, 2013

(65) Prior Publication Data

US 2015/0176917 A1 Jun. 25, 2015

(51) Int. Cl.
| | | |
|---|---|---|
| *F28D 15/04* | (2006.01) | |
| *B41J 29/377* | (2006.01) | |
| *B29C 35/16* | (2006.01) | |
| *B29C 45/00* | (2006.01) | |
| *B29K 101/00* | (2006.01) | |
| *B29L 31/00* | (2006.01) | |

(52) U.S. Cl.
CPC .............. *F28D 15/046* (2013.01); *B29C 35/16* (2013.01); *B29C 45/00* (2013.01); *B41J 29/377* (2013.01); *B29C 2035/1658* (2013.01); *B29K 2101/00* (2013.01); *B29K 2901/00* (2013.01); *B29K 2995/0013* (2013.01); *B29L 2031/757* (2013.01); *Y10T 29/49353* (2015.01)

(58) Field of Classification Search
CPC ........................................................ B41J 2/14
USPC ................................ 347/20, 21; 165/104.26
See application file for complete search history.

(56) References Cited

U.S. PATENT DOCUMENTS

| | | | |
|---|---|---|---|
| 5,608,267 A | 3/1997 | Mahulikar et al. | |
| 6,283,588 B1 * | 9/2001 | Brandon et al. | 347/86 |
| 7,600,863 B2 | 10/2009 | Brick et al. | |
| 8,496,317 B2 | 7/2013 | Ciminelli et al. | |
| 8,518,749 B2 | 8/2013 | Dahilig et al. | |
| 2002/0063762 A1 * | 5/2002 | Jozef Haan | B41J 2/17546 347/88 |
| 2005/0116372 A1 | 6/2005 | Bruning et al. | |
| 2006/0037737 A1 * | 2/2006 | Chen et al. | 165/104.26 |
| 2006/0213648 A1 * | 9/2006 | Chen et al. | 165/104.33 |
| 2008/0210407 A1 | 9/2008 | Kim et al. | |

(Continued)

FOREIGN PATENT DOCUMENTS

| | | |
|---|---|---|
| EP | 1299219 | 10/2004 |
| EP | 2511323 | 10/2012 |

OTHER PUBLICATIONS

Wallin, "Heat Pipe, selection of working fluid", Project Report, May 7, 2012, 7 pages.

(Continued)

*Primary Examiner* — Manish S Shah
*Assistant Examiner* — Roger W Pisha, II
(74) *Attorney, Agent, or Firm* — Hollingsworth Davis, LLC (57) ABSTRACT

Embodiments are directed to a molded plastic object that includes at least one vapor chamber within the plastic object. A wicking material is in contact with at least a portion of an inner wall of the vapor chamber. A working fluid located within the vapor chamber is configured to distribute heat from warmer regions of the plastic object to cooler regions of the plastic object. In some embodiments, the molded plastic object is part or all of a solid inkjet printhead.

8 Claims, 5 Drawing Sheets

(56) References Cited

U.S. PATENT DOCUMENTS

| | | | |
|---|---|---|---|
| 2009/0291213 A1* | 11/2009 | Ohshima | B41M 5/504 427/256 |
| 2009/0294104 A1* | 12/2009 | Lin et al. | 165/104.26 |
| 2011/0211010 A1* | 9/2011 | Paschkewitz | B41J 2/17593 347/18 |
| 2011/0232877 A1 | 9/2011 | Meyer, IV et al. | |
| 2011/0297355 A1 | 12/2011 | Meyer, IV et al. | |
| 2011/0315351 A1 | 12/2011 | Meyer, IV et al. | |
| 2012/0279687 A1 | 11/2012 | Meyer, IV et al. | |
| 2012/0306974 A1* | 12/2012 | Nicholson et al. | 347/86 |
| 2013/0168052 A1 | 7/2013 | Meyer, IV et al. | |
| 2013/0256866 A1 | 10/2013 | Dahilig et al. | |

OTHER PUBLICATIONS

U.S. Appl. No. 13/668,199.

* cited by examiner

MOLDED PLASTIC OBJECTS HAVING AN INTEGRATED HEAT SPREADER AND METHODS OF MANUFACTURE OF SAME

TECHNICAL FIELD

The present disclosure relates to injection-molded plastic objects that include an integrated heat spreader and methods of manufacturing and using the same.

BACKGROUND

Many objects useful in manufacturing in industries such as, for example, the automobile or the consumer electronics industry, need to be able to conduct heat away from a hot region in the object or to distribute heat evenly throughout the object. This is particularly important when at least part of the plastic object is near a heat source such as an engine block or a battery in a portable computer. Injection molding of plastics offers the potential for lower manufacturing cost and higher part-to-part uniformity so it a manufacturing process of interest to many industries. However, since most plastics have low thermal conductivity, even when conductive fillers are used, the use of plastic objects in certain applications can be limited.

Solid inkjet printheads are manufactured using stacked metal plates or stacks of plates and plastic layers. Such printheads are kept at about the phase change temperature of the solid ink that is used in the printheads with adhesively mounted resistive heaters. However, these printheads have some thermal uniformity challenges (thermal gradients)—especially for wide format (A3 paper) form factors.

SUMMARY

One way to overcome low thermal conductivity or uniformity in injection-molded plastic objects can be to integrate a higher conductivity element directly into the plastic object to facilitate uniform spreading and dissipation of heat from the injection molding process. In one aspect, a molded plastic object is disclosed that includes at least one vapor chamber within the plastic object. The vapor chamber has an inner wall. A wicking material is in contact with at least a portion of the inner wall of the vapor chamber. A working fluid is located within the vapor chamber and is configured to distribute heat from warmer regions of the plastic object to cooler regions of the plastic object. In some embodiments, the plastic molded object is part or all of a solid inkjet printhead.

In another aspect, a method of making a molded plastic object is disclosed that includes injecting a molten polymer into a mold. The mold includes at least one vapor chamber having an inner wall. The mold also includes a wicking material in contact with at least of the inner wall of the vapor chamber. The disclosed method also includes cooling the molten polymer to allow it to solidify, removing the plastic object from the mold, and filling the vapor chamber with working fluid configured to distribute heat from warmer regions of the plastic object to cooler regions of the plastic object.

In another aspect, a method of dissipating heat is disclosed that includes molding a plastic object configured to distribute heat from warmer regions of the plastic object to cooler regions of the plastic object. The plastic object includes at least one vapor chamber having an inner wall. The mold also includes a wicking material in contact with at least of the inner wall of the vapor chamber and a working fluid within the vapor chamber, the wicking material, or both. The working fluid is configured to distribute heat from warmer regions of the plastic object to cooler regions of the plastic object. The method further includes locating the plastic object in proximity to a heat source and then dissipating heat from the heat source to the plastic object.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Plastic or polymeric objects or parts are being used in manufacturing to replace metal. Plastic objects or parts can be made lighter, less expensive, and can be molded or cut into very complex shapes much more easily than metal parts. However, one property of plastics that can be very different from metals is that metals can be very good heat conductors and allow heat to propagate rapidly from warmer regions to cooler regions of the object, whereas most plastics have a very low coefficient of thermal conductivity and are very inefficient at heat transfer (heat spreading). There are many industrial applications that could benefit from using plastic parts due to their ability to be easily formed into many shapes by, molding techniques such as, for example, injection molding, cast and cure molding and laser ablation. Some of these applications could benefit from plastic parts that could more readily dissipate heat or spread it throughout the part so as to either lower the temperature of the part or reduce non-uniformity of temperature throughout the part. For example, there are applications in the automotive industry that could use plastic parts that might be in the vicinity of a heat source, or be able to spread heat or dissipate heat using the part such as away from a battery or other automotive component that is heat-sensitive. Additionally, there are applications in the consumer electronics industry where moving or spreading head away from heat sensitive components would be beneficial.

One way to increase the heat conductivity of plastics can be to add thermally conductive particles to the plastic. Another way to spread heat throughout a plastic object can be to mold a thermally conductive component such as a conductive metal rod or bar or other thermally conductive metallic object into the plastic part. Injection molding of plastic objects can produce objects that have very arbitrarily-shaped bodies. It would be useful to develop plastic objects that can spread heat and achieve thermal uniformity in a rapid fashion. In one embodiment, a plastic inkjet printhead can be envisioned as an example in which a heat spreading plastic object could be very useful.

The term solid (or phase-change) inkjet printing refers to a class of image-forming processes and/or image-forming devices that employ inks that are presented in a solid, often wax-like, form. The solid inks can be melted into a liquid form or phase between an ink loading portion of an ink storage and supply device and an ejection-type ink delivery printhead. The ejection-type ink delivery printhead may dispense the ink presented to it in a melted/liquid form or phase onto a heated intermediate transfer structure such as an intermediate transfer drum, or directly onto a substrate of an image receiving medium, such as paper, which may also have been preliminarily heated to better accept the melted ink.

Solid (or phase-change) inkjet printers can melt the solid ink to a liquid at an outlet end of the ink storage and supply device before the ink is fed into the complex plumbing of an inkjet printhead. The ink then, in its heated/liquid form or phase, can be jetted from the nozzles using a piezoelectric actuated printhead, sometimes referred to as a "jetstack." The printhead can be used to deliver the ink, in its heated/liquid form or phase, to a heated surface of the intermediate transfer apparatus for further transfer to a substrate of image receiving medium, or directly to the substrate where the ink cools to form a sometimes significantly raised printed image on the substrate.

It would be desirable to reduce large temperature gradients within the inkjet printhead that are associated with a molded printhead so that the ink jetting process is uniform across the printhead. In the case of an injection-molded plastic printhead, which offers substantial cost reduction compared to metal construction, achieving thermal uniformity such as a variation less than 1-3° C. across the face of the printhead can be challenging due to the low thermal conductivity of injection-molded plastics. An integrated heat spreader can provide improved thermal uniformity and ink jetting performance.

The present disclosure describes a molded plastic object, such as an inkjet print head, that includes an integrated heat spreader or heat pipe. The integrated heat spreader can distribute heat from warmer regions of the plastic object to cooler regions of the plastic object and allow rapid and uniform heat distribution throughout the object. With this integrated heat spreader, heat from the injection molding process can be rapidly directed away from hotter regions or regions around sensitive electronic components within the molded plastic object and can thus protect the components and prevent them from moving out of position.

The disclosed plastic object includes an integrated heat spreader that has at least one vapor chamber within the plastic object having an inner wall. In some embodiments, the wall of the vapor chamber can be tubular with a circular or ovoid cross-section. In other embodiments, the wall of the vapor chamber can have a flat tubular cross-section. The vapor chamber can have walls that have any shape that is continuous and closed as long as it provides a surface for contact of the wicking material with a working fluid. The vapor chamber has an evaporating section and a condensing section. The evaporating section can be in thermal contact with warm portions of the molded plastic object as it cools. The condensing section can be in thermal contact with cooler portions of the molded plastic object as it cools. Heat is transferred from warmer portions of the cooling molded plastic object to cooler portions of the molded plastic object thereby distributing the heat in the molded plastic object uniformly throughout the object and eliminating or greatly reducing thermal gradients in the material. In some embodiments, the vapor chamber can have a condensing section that is in contact with a heat sink such as an outer surface of the molded plastic object or an external heat sink in thermal contact with an outer surface of the molded plastic object.

The vapor chamber includes a wicking material therewithin that is in contact with at least a portion of the inner wall of the vapor chamber. The wicking material can be any porous material that has an affinity for the working fluid. In some embodiments, the wicking material can be a hydrophilic material with high surface area, such as a mixed powder of small mesh size, that can be sintered to the inner wall of the vapor chamber as disclosed, for example, in U.S. Pat. Appl. Publ. No. 2013/0168052 A1 (Meyer, IV et al.) or by other similar/analogous processes that are compatible with plastic materials and processing. In other embodiments, the wicking material can be aggregating microfibers capable of absorbing the working fluid as disclosed, for example, in U.S. Pat. Appl. Publ. No. 2008/0210407 (Kim et al.). In yet other embodiments, the wicking material may include a supporting rack of a plurality of separated channels that allow vapor of the working fluid to pass through as disclosed, for example, in U.S. Pat. Appl. Publ. No. 2011/0315351 (Meyer, IV et al.). The wicking material can be any heat-dissipating device that can interact with the working fluid vapor and can help to transfer heat to or from the working fluid. Other useful wicking materials are disclosed, for example, in U.S. Pat. Appl. Publ. Nos. 2011/0232877 and 2012/0279687 (both to Meyer, IV et al.). The above cited references are herein incorporated by reference in their entirety. In some embodiments, some or all of the components in a thermal spreader, such as one available from Celsia Technologies, Miami, Fla. under the trade name NANOSPREADER, may be useful as an integrated heat spreader or heat pipe system.

In some embodiments, the wicking material can be porous polymeric foam. The porous foam can provide sufficient wicking action to allow a heat pipe thermodynamic cycle of evaporation and condensation to be completed in such a way that there is a defined cooler (condensing) section and a defined warmer (evaporating) section. If utilized, the porous polymeric foam can be easily integrated into the molding process of the molded plastic object. Any inserts in the mold such as resistive heating wires or electrical wires may need to be anchored in place as in the molding of the body of the molded plastic object if the porous polymeric foam is also injection-molded into openings in the molded plastic object. There also can be adhesion and integration between the porous polymeric foam wicking material and the plastic material used for the body of the molded plastic body.

Figure 1:
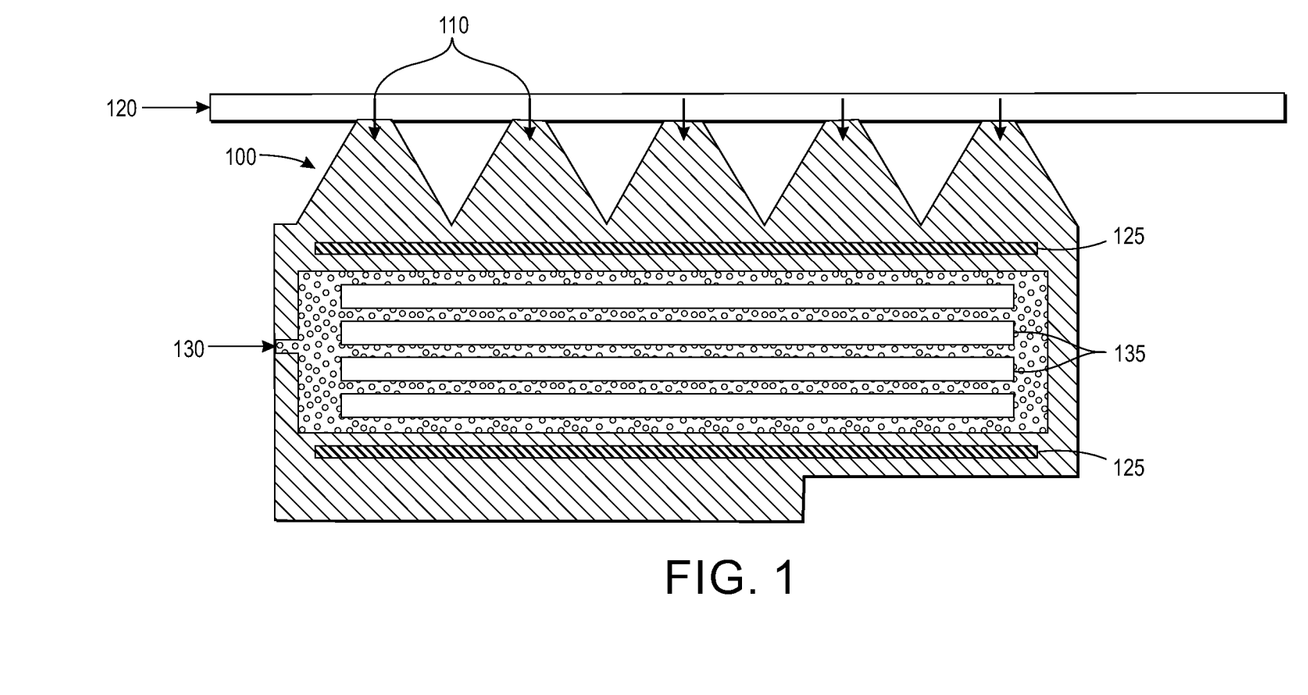
FIG. 1 is a cross-sectional view of a molded plastic inkjet printhead that includes a disclosed integrated heat spreader.

FIG. 1 is a cross-sectional view of a molded plastic jetstack (inkjet printhead) that includes a disclosed integrated heat spreader Inkjet printhead 100 includes injection molding gates 110 that allow molten polymer injection from runner 120 to form the body of inkjet printhead 100 Inkjet printhead 100 has cavities 135 that can contain sensitive electronic parts or other parts that need cooling or uniform temperatures. The mold for inkjet printhead 100 includes resistive heaters 125, vapor chamber 140, and jetstack plates 150 as inserts into the mold. The inserts may be held in place, for example, using magnets or thermally-stable adhesives. Filling port 130 that connects to vapor chamber 140 is used in a second injection molding step to inject porous polymeric wicking material into vapor chamber 140. Evaporating sections include sections of vapor chamber 140 that are in proximity to resistive heaters 125. Condensing sections include sections of vapor chamber 140 that are away from resistive heaters 125 and proximal to the edges or outer surfaces of injection-molded inkjet printhead 100.

Figure 2:
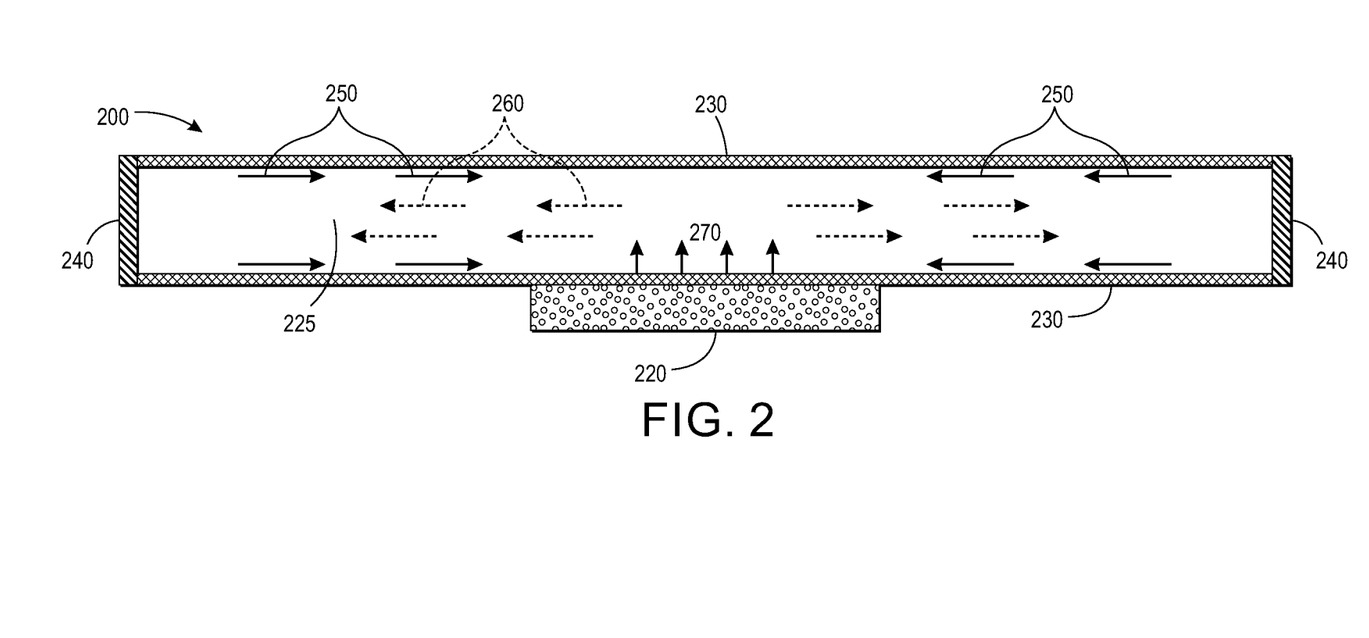
FIG. 2 is a cross-sectional illustration of a basic configuration of a vapor chamber heat spreader according an example embodiment disclosed herein.

FIG. 2 is a cross-sectional illustration of a basic configuration of a vapor chamber heat spreader according an example embodiment disclosed herein. Heat spreader 200 has working fluid inside of vapor chamber 225. Vapor chamber 225 is sealed at both ends and on all sides. At least a portion of the inner walls of vapor chamber 225 include wicking material 230. Vapor chamber is in contact with heat source 220. Heat source 220 can be a resistive heater or a hot zone in the interior of an injected molded plastic that is cooling. Heat source 220 provides heat energy 270 to the working fluid in vapor chamber 225. This causes the working fluid to vaporize and conduct heat as vapor 260 or warm fluid away from heat source 220 as shown by dashed arrows. Heated vapor 260 migrates from heat (evaporation region) source 220 to cold region (condensation region) 240 that can be at an edge of the injection-molded plastic part. Thus, the thermodynamic evaporation/condensation cycle within vapor chamber 225 distributes heat from warmer regions to colder regions.

The working fluid can be any fluid that can change phases within the vapor chamber and thereby transfer heat from a warmer region to a cooler region of a molded plastic object. Typically, the working fluid can undergo a phase change in the operating temperature range of interest which, can be from about −20° C. to about 120° C. In some embodiments, the useful range can be from about 30° C. to about 110° C. Useful fluids include, but are not limited to alcohols, and other organic materials having a boiling point in the operating range. Useful working fluids can include pentane, acetone, methanol, ethanol, heptane, and toluene. In some embodiments, water can be the working fluid since it transitions from liquid to vapor at around 100° C. It is also possible to improve the thermal performance of working fluids by introducing thermally-conductive particles made of, for example, copper or other metals having a high coefficient of thermal conductivity. In some embodiments, the thermally-conductive particles can be nanoparticles and can create a so-called "nanofluid."

Figure 3:
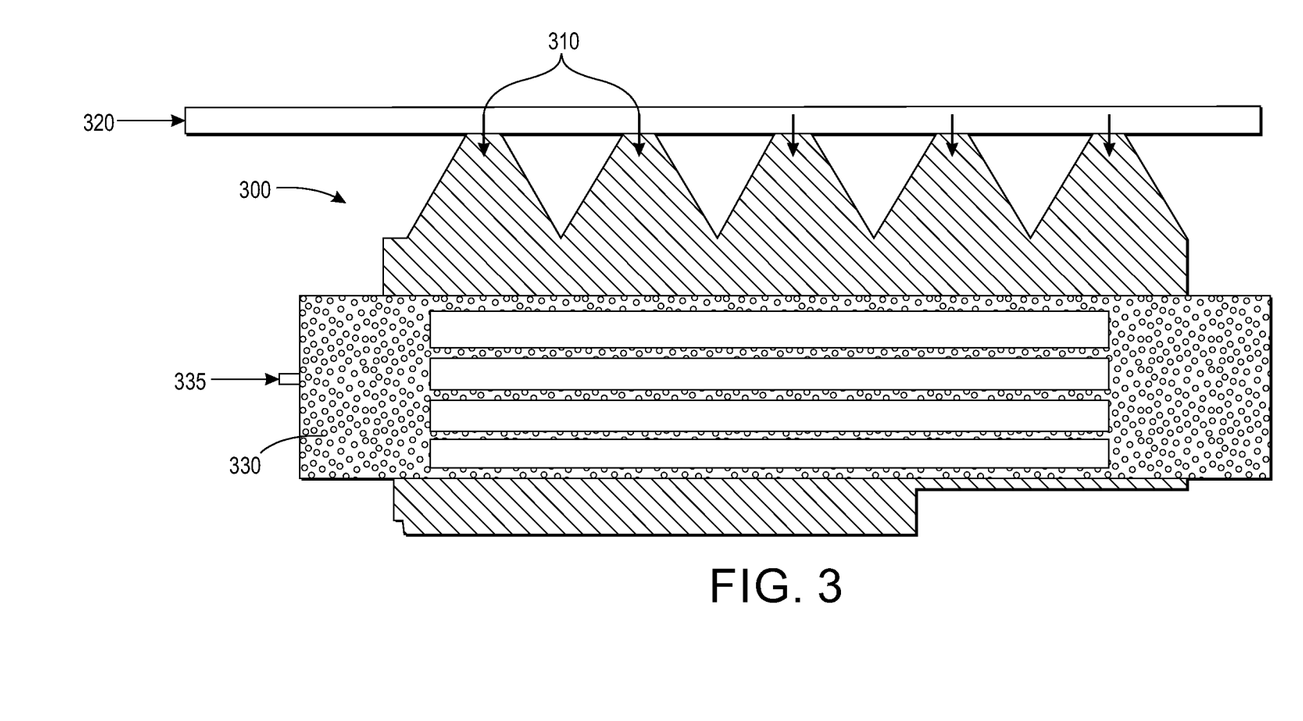
FIG. 3 is a cross-sectional view showing a one-shot injection molding process for making a molded plastic inkjet printhead that includes an integrated heat spreader.

In another aspect, a method of making a molded plastic object is disclosed that includes injecting a molten polymer into a mold. The mold includes at least one vapor chamber having an inner wall and a wicking material in contact with at least a portion of the inner wall of the vapor chamber. The disclosed method further includes cooling the molten polymer to allow it to solidify and then removing the solidified polymer from the mold. A working fluid is introduced into the vapor chamber. The working fluid is configured to distribute heat from warmer regions of the plastic object to cooler regions of the plastic object. In some embodiments, the mold used for injection molding the molded plastic object can include a cavity for the wicking material. The molded plastic object can be made using one injection step using a co-molding technique such as PARTICLE-FOAM COMPOSITE INJECTION MOUDING (PCIM), Augburg GmbH, Lossburg, Germany. PCIM is a one injection step process in which a foamed moulded part is permanently bonded with a polymeric components. PCIM is disclosed, for example in European Pat. No. 1,299,219 (Ziegler, et al.). In some embodiments, the molded plastic object can be made as shown in FIG. 3. Master mold cavity 330 is used to form a vapor chamber with porous foam particles therewithin. Polymeric particles having a relatively low processing temperature such as expandable polyethylene, expandable polypropylene, expandable polyurethane, or expandable polystyrene are injected into master mold cavity 330 through port 335 to form a porous foam inside master mold cavity 330. At the same time, another polymer that forms the body of inkjet printhead 300 is injected into a mold to form the main body of the printhead. This polymer is injected through injection molding gates 310 from runner 320. The polymer for the body of the inkjet printhead is made of a polymer having a higher melting temperature than the particles the make up the porous foam. Suitable polymers for the body of the inkjet printhead include, but are not limited to, polymers such as polyethylene, polypropylene, polystyrene, polyetherketone, polysulfone and any easily injected molded plastic polymers or copolymers that are thermally stable at the temperature of operation of the inkjet printer. In some embodiments, the polymers can include thermally-conductive fillers to improve thermal conductivity of the plastic. The thermally-conductive fillers can include metallic particles such as copper, aluminum, or other metals and alloys that have high thermal conductivity. Additionally, graphene and its derivatives as well as carbon nanotubes may be useful as thermally-conductive fillers. The combination of the integrated heat spreader and plastics that have thermal conductivity can further enhance temperature uniformity in the disclosed printheads.

Figure 4A:
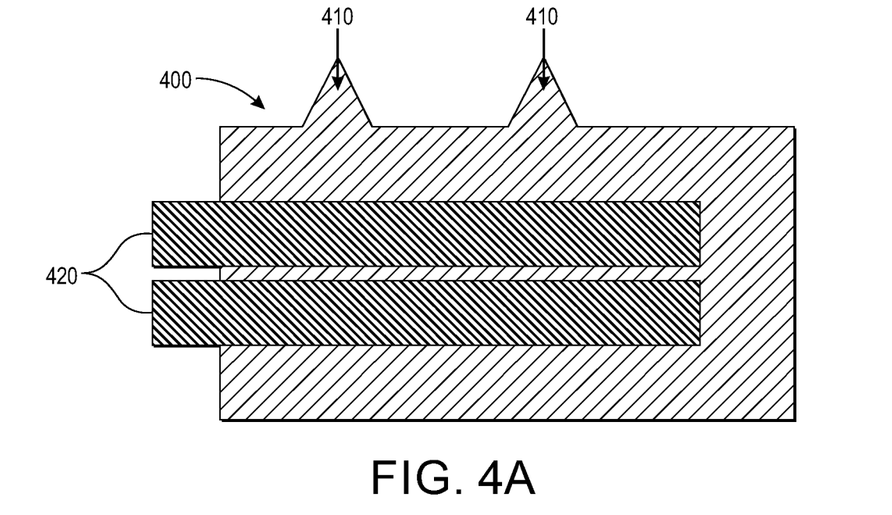
FIGS. 4A and 4B are cross-sectional schematic views illustrating a two-step injection molding process for making a molded plastic inkjet printhead that includes an integrated heat spreader.
Figure 4B:
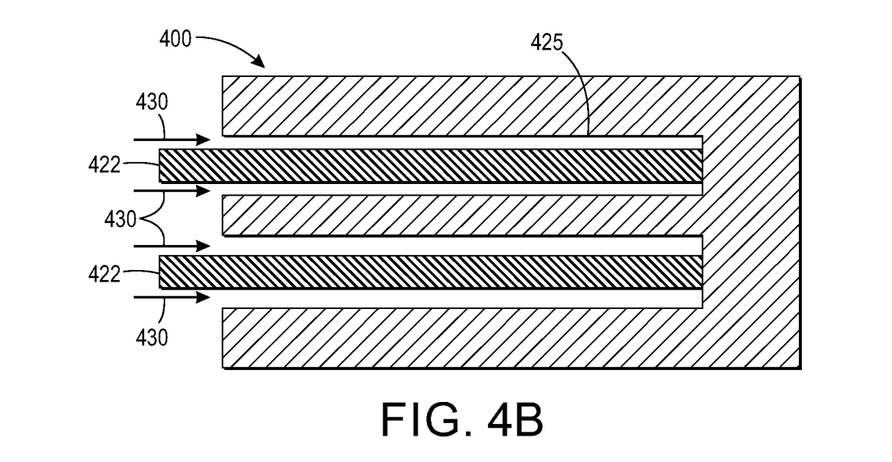

In other embodiments of the disclosed method, a two-step process can be made according to an embodiment of the disclosed method. FIGS. 4A and 4B are cross-sectional schematic views illustrating a two-step injection molding process for making a molded plastic inkjet printhead that includes an integrated heat spreader. In a first processing step, shown in FIG. 4A, inkjet printhead body 400 is formed by injection molten polymer under pressure through gates 410 with dummy insert 420 inserted into the mold to hold space for the insertion of components of an integrated heat spreader. After the molten polymer cools, dummy inserts 420 are removed and vapor chamber inserts 422 are inserted into the space vacated by the removal of dummy inserts 420. In a second step, shown in FIG. 4B, porous foam is injection-molded in the spaces 430 between vapor chamber inserts 422 and inner wall 425 of the eventual integrated heat spreader. The porous foam forms wicking material in contact with at least a portion of inner wall 425 of the vapor chamber. Using this two-step process, higher temperature polymers such as, for example, polysulfone can be used to create the inkjet printhead. In one embodiment, reactive injection molding can be used to create the wicking material, particularly when it is a polymeric foam.

Following either the one-shot process described above and diagrammed in FIG. 3 or the two-shot process described above and illustrated in FIGS. 4A and 4B, a vacuum can be applied to the vapor chamber and a working fluid that undergoes a phase change in an operating temperature range of interest can be injected into the vapor chamber. In some embodiments, the working fluid can be saturated steam. The vapor chamber requires quick sealing which can be done using a rubber or elastomeric plug under compression that can expand to fill the port through which the working fluid was injected. The plug can then be adhesively sealed in place.

Figure 5:
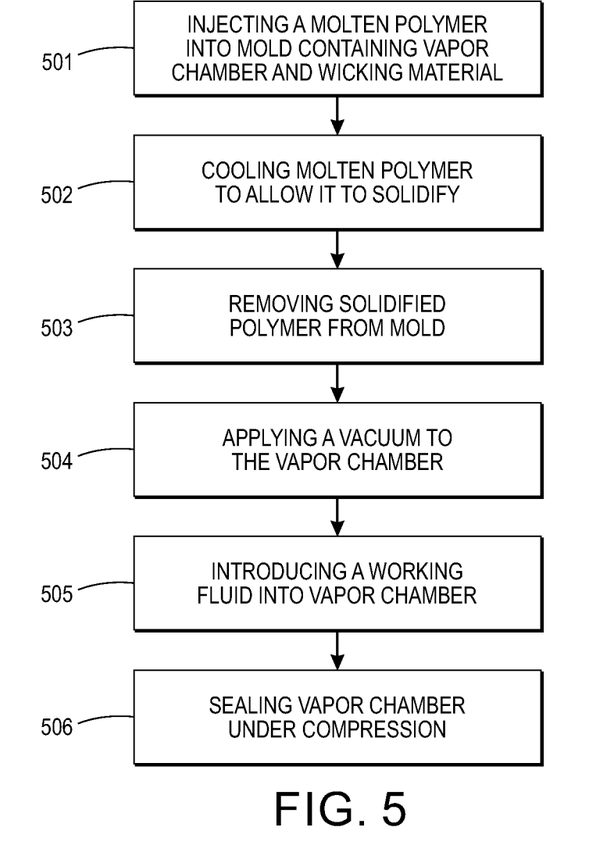
FIG. 5 is a flow diagram of an embodiment of a process of making a disclosed plastic molded object.

FIG. 5 is a flow diagram of an embodiment of a process of making a disclosed plastic molded object. The disclosed process includes injecting a molten polymer into a mold containing a vapor chamber and wicking material (501). Then, the molten polymer is cooled to allow it to solidify (502). The solidified polymer is removed from the mold (503). A vacuum is then applied to the vapor chamber (504). A working fluid is introduced into the vapor chamber (505) and then the vapor chamber is sealed under compression (506).

A method of dissipating heat is also disclosed that includes molding a plastic object configured to distribute heat from warmer regions of the plastic object to cooler regions of the plastic object. The plastic object includes at least one vapor chamber within the plastic object having an inner wall, a wicking material in contact with at least a portion of the inner wall of the vapor chamber and a working fluid within the vapor chamber, the wicking material, or both. The working fluid is configured to distribute heat from warmer regions of the plastic object to cooler regions of the plastic object in a rapid manner. The method further includes locating the plastic object in proximity to a heat source such as an automobile engine block, an electronic heat source in an electronic device, or, for example, in an inkjet printhead. The method also includes dissipating heat from the heat source to the plastic object. The heat can then be distributed uniformly throughout the plastic object or can be transferred to a heat sink also in proximity with another portion of the plastic object.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A molded plastic object comprising an injected molded polymeric material, the molded plastic object comprising:
   at least one vapor chamber within the plastic object having an inner wall;
   a wicking material in contact with at least a portion of the inner wall of the vapor chamber; and
   a working fluid within the vapor chamber, the working fluid, the wicking material, or both, configured to distribute heat from warmer regions of the plastic object to cooler regions of the plastic object, wherein the molded plastic object is a solid phase-change inkjet printhead for ink that changes phase from a solid to a liquid.

2. A molded plastic object according to claim 1, comprising an inkjet printhead.

3. A molded plastic object according to claim 1, wherein the wicking material comprises a polymeric foam.

4. A molded plastic object according to claim 1, wherein the working fluid undergoes a phase change.

5. A molded plastic object according to claim 4, wherein the working fluid undergoes a phase change in the temperature range of from about −20° C. to about 120° C.

6. A molded plastic object according to claim 1, wherein the injection-molded polymeric material comprises thermally-conductive fillers.

7. A molded plastic object according to claim 1, wherein the working fluid comprises thermally-conductive particles.

8. A molded plastic object according to claim 1, wherein the working fluid comprises water.

* * * * *